United States Patent [19]
Koike

[11] Patent Number: 5,572,603
[45] Date of Patent: Nov. 5, 1996

[54] IMAGE PROCESSING METHOD AND DEVICE USING SUCH METHOD

[75] Inventor: Kazumasa Koike, Atsugi, Japan

[73] Assignee: Ricoh Company, Ltd., Tokyo, Japan

[21] Appl. No.: 391,462

[22] Filed: Feb. 21, 1995

Related U.S. Application Data

[63] Continuation of Ser. No. 61,687, May 17, 1993, abandoned.

[30] Foreign Application Priority Data

May 20, 1992 [JP] Japan ................................ 4-151156

[51] Int. Cl.⁶ .................................................. G06K 9/48
[52] U.S. Cl. ........................................ 382/199; 382/205
[58] Field of Search ................................. 382/22, 27, 54, 382/18, 30, 33; 358/456, 288; 386/205, 209, 199, 200, 217, 254, 266

[56] References Cited

U.S. PATENT DOCUMENTS

| | | | |
|---|---|---|---|
| 4,003,024 | 1/1977 | Riganati | 340/146.3 H |
| 4,327,354 | 4/1982 | Persoon | 382/205 |
| 4,506,382 | 3/1985 | Hada et al. | 382/27 |
| 4,628,533 | 12/1986 | Hongo et al. | 382/205 |
| 4,630,307 | 12/1986 | Cok | 382/27 |
| 4,710,965 | 12/1987 | Kobayashi | 382/41 |
| 4,783,753 | 11/1988 | Crimmins | 364/574 |
| 4,783,840 | 11/1988 | Song | 382/54 |
| 4,953,114 | 9/1990 | Sato | 382/50 |
| 4,969,202 | 11/1990 | Groezinger | 382/27 |
| 5,023,919 | 6/1991 | Wataya | 382/54 |
| 5,031,227 | 7/1991 | Raasch et al. | 382/22 |
| 5,060,082 | 10/1991 | Matsumoto et al. | 358/447 |
| 5,115,477 | 5/1992 | Groezinger | 382/22 |
| 5,212,741 | 5/1993 | Barski et al. | 382/51 |
| 5,222,159 | 6/1993 | Kawamura et al. | 382/48 |

Primary Examiner—Joseph Mancuso
Attorney, Agent, or Firm—Lowe, Price, LeBlanc & Becker

[57] ABSTRACT

An image processing device in which each pixel data of a gray-scale image, which data is obtained by scanning an original, is converted into a binary image-signal. The device comprises a matrix preparing unit for preparing a 3*3 pixel matrix comprising a focus pixel positioned in the center of the matrix and bordering pixels surrounding the focus pixel, a determining unit for determining whether or not the focus pixel is an edge pixel by comparing an intensity of the focus pixel with intensities of each of three bordering pixels consecutively arranged around the focus pixel, the comparison using the focus-pixel signal and bordering pixel-signals supplied by the matrix preparing unit, and the determining unit also being for outputting a control signal indicating the determined condition of the focus pixel. The device further comprises an enhancing unit for enhancing the focus pixel signal, and a selecting unit for selecting a pixel signal, in accordance with the control signal, from among the focus pixel signal and the enhanced pixel signal.

18 Claims, 5 Drawing Sheets

FIG. 1

| A | B | C |
|---|---|---|
| D | E | F |
| G | H | I |

FIG. 2A

| B | B | B |
|---|---|---|
| X | W | X |
| X | X | X |

FIG. 2B

| B | B | X |
|---|---|---|
| B | W | X |
| X | X | X |

FIG. 2C

| W | W | W |
|---|---|---|
| X | B | X |
| X | X | X |

FIG. 2D

| W | W | X |
|---|---|---|
| W | B | X |
| X | X | X |

FIG. 2E

| B | X | X |
|---|---|---|
| B | W | X |
| B | X | X |

FIG. 2F

| X | X | X |
|---|---|---|
| B | W | X |
| B | B | X |

FIG. 2G

| W | X | X |
|---|---|---|
| W | B | X |
| W | X | X |

FIG. 2H

| X | X | X |
|---|---|---|
| W | B | X |
| W | W | X |

FIG. 2I

| X | X | X |
|---|---|---|
| X | W | X |
| B | B | B |

FIG. 2J

| X | X | X |
|---|---|---|
| X | W | B |
| X | B | B |

FIG. 2K

| X | X | X |
|---|---|---|
| X | B | X |
| W | W | W |

FIG. 2L

| X | X | X |
|---|---|---|
| X | B | W |
| X | W | W |

FIG. 2M

| X | X | B |
|---|---|---|
| X | W | B |
| X | X | B |

FIG. 2N

| X | B | B |
|---|---|---|
| X | W | B |
| X | X | X |

FIG. 2O

| X | X | W |
|---|---|---|
| X | B | W |
| X | X | W |

FIG. 2P

| X | W | W |
|---|---|---|
| X | B | W |
| X | X | X |

FIG. 3A

| X | W | X |
|---|---|---|
| B | B | B |
| X | X | X |

FIG. 3B

| W | X | B |
|---|---|---|
| X | B | X |
| B | X | X |

FIG. 3C

| X | B | X |
|---|---|---|
| W | W | W |
| X | X | X |

FIG. 3D

| B | X | W |
|---|---|---|
| X | W | X |
| W | X | X |

FIG. 3E

| X | B | X |
|---|---|---|
| W | B | X |
| X | B | X |

FIG. 3F

| B | X | X |
|---|---|---|
| X | B | X |
| W | X | B |

FIG. 3G

| X | W | X |
|---|---|---|
| B | W | X |
| X | W | X |

FIG. 3H

| W | X | X |
|---|---|---|
| X | W | X |
| B | X | W |

FIG. 3I

| X | X | X |
|---|---|---|
| B | B | B |
| X | W | X |

FIG. 3J

| X | X | B |
|---|---|---|
| X | B | X |
| B | X | W |

FIG. 3K

| X | X | X |
|---|---|---|
| W | W | W |
| X | B | X |

FIG. 3L

| X | X | W |
|---|---|---|
| X | W | X |
| W | X | B |

FIG. 3M

| X | B | X |
|---|---|---|
| X | B | W |
| X | B | X |

FIG. 3N

| B | X | W |
|---|---|---|
| X | B | X |
| X | X | B |

FIG. 3O

| X | W | X |
|---|---|---|
| X | W | B |
| X | W | X |

FIG. 3P

| W | X | B |
|---|---|---|
| X | W | X |
| X | X | W |

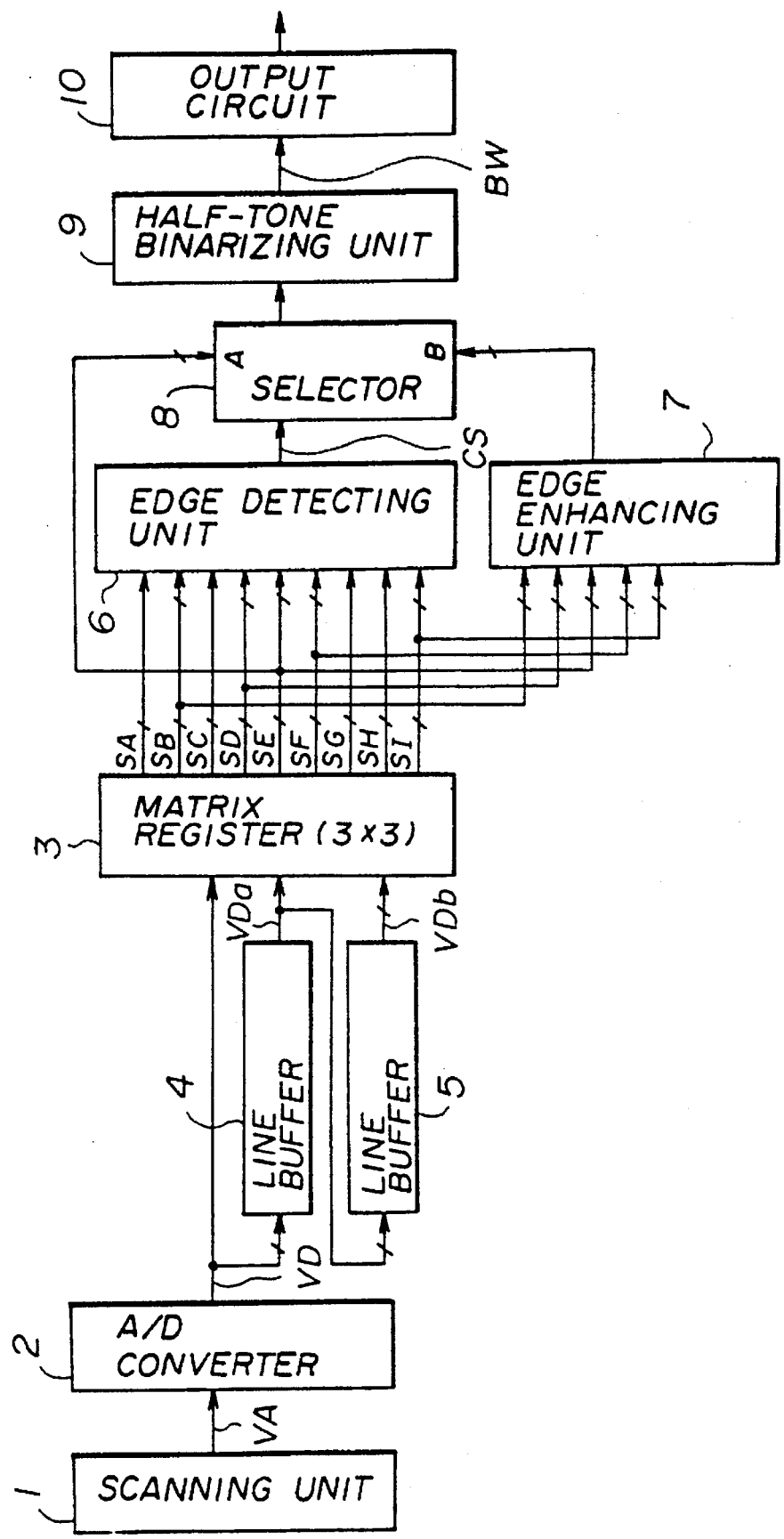

IMAGE PROCESSING METHOD AND DEVICE USING SUCH METHOD

This is a continuation of U.S. patent application Ser. No. 08/061,687, filed May 17, 1993, now abandoned.

BACKGROUND OF THE INVENTION

The present invention relates to an image processing method and an image processing device, and more particularly to an image processing method by which each pixel of gray-scale data obtained by a raster scanning is determined to either include or not include an edge of a picture, and to an image processing device in which gray-scale data obtained by a raster scanning is converted into binary image data.

In a picture scanning apparatus such as a facsimile machine, various image processing operations are performed to scanned image data so as to improve an output picture quality.

For original printed characters, since intensity difference between black portions corresponding to characters and white portions corresponding to blank spaces is very large, a process which enhances the contrast of the black portions and the white portions has been realized. As an example of such a process, a Modulation Transfer Function (MTF) correction process has been applied so as to eliminate a deterioration of a picture such as blurring, which occurs in an optical scanning system.

Additionally, when scanning a half-tone image such as a photograph, gradation of an original image is represented in a reproduced image by binarizing gray-scale image information in accordance with a threshold value obtained by means of the systematic dither matrix or by using a half-tone binarizing process such as the error diffusion process in which the dispersion of intensity caused by binarizing is diffused to surrounding pixels.

When the original image includes only characters (hereinafter called non-half-tone image) or only pictures having half-tone image, the above-mentioned processes can be applied to improve the reproduced image. However, when a non-half-tone image and a half-tone image are mixed in an original, the following disadvantages result.

That is, if the MTF correction is applied to a half-tone image, gradation is not maintained and thus the half-tone image quality is deteriorated. On the other hand, if the half-tone image process is applied to a non-half-tone image, boundary portions (edge portions) lying between black portions and white portions are blurred.

In order to eliminate the above-mentioned problem, an image processing device in which the MTF correction process or the half-tone image process is selectively applied is realized. In this device, the MTF correction process is applied to an image portion determined as a non-half-tone image, and the half-tone binarizing process is applied to an image portion determined as a half-tone image.

However, the above-mentioned device requires an image area separation process, a non-half-tone binarizing process, and a half-tone binarizing process, and thus manufacturing costs thereof are high.

A device eliminating such a problem has been realized, such as a device in which the half-tone binarizing process is applied for basically all pixels excluding edge pixels. An edge pixel is a pixel corresponding to the transition of a white image to a black image. A pixel is determined to be such an edge pixel by comparing the pixel being processed with bordering pixels. A pixel is determined to be an edge pixel when intensity difference between the pixel and bordering pixels exceeds a predetermined value. A black pixel signal is output for an edge pixel.

In this device, a non-half-tone image such as a character positioned in a half-tone image area can be reproduced clearly, and a high quality picture can thus be obtained at a relatively low cost.

However, the above-mentioned conventional device has the following problems. That is, while enhancing a character in a white area can be performed effectively, a moiré generated when scanning a mesh picture is also undesirably enhanced. Additionally, when scanning an original whose surface is not white, improvement of a reproduced image obtained is not sufficient.

SUMMARY OF THE INVENTION

It is a general object of the present invention to provide an image processing method and an image processing device in which the above-mentioned problems are eliminated.

A more specific object of the present invention is to provide an image processing method and an image processing device which does not enhance a moiré generated when scanning a mesh picture.

Another object of the present invention is to provide an image processing method and an image processing device by which an improvement of a reproduced image is obtained when an original whose surface is not white is scanned.

In order to achieve the above-mentioned objects, an image processing method according to the present invention is used in which image processing device each pixel data of a gray-scale image, which data is obtained by means of scanning an original, is determined as either being or not being an edge pixel corresponding to an edge of a picture of the original, the method comprises steps of:

preparing a 3*3 pixel matrix comprising a focus pixel currently being processed, so that the focus pixel is positioned in the center of the matrix and bordering pixels surround the focus pixel; and determining the focus pixel as either being or not being an edge pixel by comparing an intensity of the focus pixel with an intensity of each of three bordering pixels arranged consecutively around the focus pixel.

Additionally, an image processing method according to the present invention, in which image processing device each pixel data of a gray-scale image, which data is obtained by means of scanning an original, is determined as either being or not being an edge pixel corresponding to an edge of a picture of the original, the method comprises steps of:

preparing a 3*3 pixel matrix comprising a focus pixel currently being processed, so that the focus pixel is positioned in the center of the matrix and so that eight bordering pixels surround the focus pixel, the pixel matrix including two first pixels and a second pixel, one of the two first pixels being positioned at each of two sides of the focus pixel so that the two first pixels and the focus pixel lie along a line, the second pixel being positioned adjacent to the focus pixel and at an equal distance from either of the first pixels; and determining whether or not the focus pixel is an edge pixel by comparing an intensity of the second pixel with intensities of each of the first pixels and the focus pixel.

Additionally, an image processing device according to the present invention, in which image processing device each pixel data of a gray-scale image, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the matrix preparing unit outputting a focus-pixel signal, and bordering-pixel signals corresponding to each of the bordering pixels;

determining unit for determining whether or not the focus pixel is an edge pixel by comparing an intensity of the focus pixel with each of intensities of three bordering pixels consecutively arranged around the focus pixel, the comparison using the focus-pixel signal and bordering pixel-signals supplied by the matrix preparing unit, and the determining unit also being for outputting a control signal indicating the above determined condition of the focus pixel;

enhancing unit for enhancing the focus pixel-signal supplied by the matrix preparing unit by applying a predetermined enhancing process thereto, and for outputting an enhanced pixel signal;

selecting unit for selecting a pixel signal, in accordance with the control signal supplied by the determining unit, from among the focus-pixel signal supplied by the matrix preparing unit and the enhanced pixel signal supplied by the enhancing unit, the enhanced pixel signal being output as a selected pixel signal when the control signal indicates that the focus pixel is an edge pixel, and the focus pixel signal being output as a selected pixel signal when the control signal does not indicate that the focus pixel is an edge pixel; and processing unit for processing the selected pixel signal supplied by the selecting unit by applying a half-tone binarizing process, and for outputting the binary image signal.

Additionally, an image processing device according to the present invention, in which image processing device each pixel data of a gray-scale image, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the matrix preparing unit outputting a focus-pixel signal, and bordering-pixel signals corresponding to each of the bordering pixels;

determining unit for determining whether or not the focus pixel is an edge pixel by comparing an intensity of the focus pixel with each of intensities of three bordering pixels consecutively arranged around the focus pixel, the comparison using the focus-pixel signal and bordering pixel-signals supplied by the matrix preparing unit, and the determining unit also for outputting a control signal indicating the above determined condition of the focus pixel;

smoothing unit for smoothing the focus pixel signal supplied by the matrix preparing unit by applying a predetermined enhancing process, and for outputting a smoothed pixel signal;

selecting unit for selecting a pixel signal, in accordance with a signal supplied by the determining unit, from among the focus-pixel signal supplied by the matrix preparing unit and the smoothed pixel signal supplied by the smoothing unit, and for outputting the selected pixel signal corresponding to the focus pixel; and processing unit for processing the selected pixel signal supplied by the selecting unit by applying a half-tone binarizing process thereto, and for outputting the binary image-signal.

Additionally, an image processing device according to the present invention, in which image processing device each pixel data of a gray-scale image data, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the pixel matrix including two first pixels and a second pixel, one of the two first pixels being positioned at each of two sides of the focus pixel so that the two first pixels and the focus pixel lie along a line, the second pixel being positioned adjacent to the focus pixel and at equal distance from either of the first pixels, the matrix preparing unit outputting a focus-pixel signal and bordering-pixel signals corresponding to each of the bordering pixels;

determining unit for determining whether or not the focus pixel is an edge pixel by comparing intensity of the second pixel with the intensities of each of the first pixels and the focus pixel, and for outputting a control signal indicating the above determined condition of the focus pixel;

enhancing unit for enhancing the focus-pixel signal supplied by the matrix preparing unit by applying a predetermined enhancing process thereto, and for outputting an enhanced pixel signal;

selecting unit for selecting, in accordance with the control signal supplied by the determining unit, a pixel signal from among the focus-pixel signal supplied by the matrix preparing unit and the enhanced pixel signal supplied by the enhancing unit, the enhanced pixel signal being output as a selected pixel signal when the control signal indicates that the focus pixel is an edge pixel and the focus-pixel signal being output as a selected pixel signal when the control signal does not indicate that the focus pixel is an edge pixel; and processing unit for processing the selected pixel-signal supplied by the selecting unit by applying a half-tone binarizing process thereto, and for outputting the binary image signal.

Additionally, an image processing device according to the present invention, in which image processing device each pixel data of a gray-scale image, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the pixel matrix including two first pixels and a second pixel, one of the two first pixels being positioned at each of two sides of the focus pixel so that the two first pixels and the focus pixel lie along a line, the second pixel being positioned adjacent to the focus pixel and at equal distance from either of the first pixels, the matrix preparing unit outputting a focus pixel signal, and bordering-pixel signals corresponding to each of the bordering pixels;

determining unit for determining whether or not the focus pixel is an edge pixel by comparing the intensity of the second pixel with each of intensities of each of the first pixels and the focus pixel, and for outputting a control signal indicating the above determined condition of the focus pixel;

smoothing unit for smoothing the focus pixel signal supplied by the matrix preparing unit by applying a predetermined enhancing process, and for outputting a smoothed pixel signal;

selecting unit for selecting a pixel signal, in accordance with the control signal supplied by the determining unit, from among the focus-pixel signal supplied by the matrix preparing unit and the smoothed pixel signal supplied by the smoothing unit, and for outputting the selected pixel-signal corresponding to the focus pixel; and processing unit for processing the selected pixel-signal supplied by the selecting unit by applying a half-tone binarizing process thereto, and for outputting the binary image signal.

Additionally, an image processing device according to the present invention, in which image processing device each pixel data of a gray-scale image data, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the matrix preparing unit outputting a focus-pixel signal, and bordering-pixel signals corresponding to each of the bordering pixels;

determining unit for determining whether the focus pixel is an edge pixel corresponding to an edge of a picture of the original, a non-edge pixel not corresponding to an edge of the picture of the original, or an unclassifiable pixel which does not correspond either to an edge pixel or to a non-edge pixel, the determination being performed using the focus-pixel signal and the bordering pixel-signals supplied by the matrix preparing unit, and the determination being performed by comparing an intensity of the focus pixel with intensities of each of three bordering pixels consecutively arranged around the focus pixel, the determining unit outputting a control signal indicating the above determined condition of the focus pixel;

enhancing unit for enhancing the focus pixel signal supplied by the matrix preparing unit by applying a predetermined enhancing process, and for outputting an enhanced pixel signal;

smoothing unit for smoothing the focus pixel signal supplied by the matrix preparing unit by applying a predetermined enhancing process thereto, and for outputting a smoothed pixel signal;

selecting unit for selecting, in accordance with the control signal supplied by the determining unit, a pixel signal from among the focus-pixel signal supplied by the matrix preparing unit, the enhanced pixel signal supplied by the enhancing unit, and the smoothed pixel signal supplied by the smoothing unit, the enhanced pixel signal being output as a selected pixel signal when the control signal indicates the focus pixel is an edge pixel, the smoothed pixel signal being output as a selected signal when the control signal indicates that the focus pixel is a non-edge pixel, and the focus pixel signal being output when the control signal indicates that the focus pixel is a pixel other than an edge pixel and non-edge pixel; and processing unit for processing the selected pixel-signal supplied by the selecting unit by applying a half-tone binarizing process thereto, and for outputting the binary image signal.

Additionally, an image processing device according to the present invention, in which image processing device each pixel data of a gray-scale image, which data is obtained by scanning an original, is converted into a binary image-signal, the image processing device comprises:

matrix preparing unit for preparing a 3*3 pixel matrix comprising a focus pixel currently being processed, so that the focus pixel is positioned in the center of the matrix and bordering pixels surround the focus pixel, the pixel matrix including two first pixels and a second pixel, one of the two first pixels being positioned at each of two sides of the focus pixel so that the two first pixels and the focus pixel lie along a line, the second pixel being positioned adjacent to the focus pixel and at equal distance from either of the first pixels, the matrix preparing unit outputting a focus-pixel signal, and bordering-pixel signals corresponding to each of the bordering pixels;

determining unit for determining whether the focus pixel is an edge pixel corresponding to an edge of a picture of the original, a non-edge pixel not corresponding to an edge of the picture of the original, or an unclassifiable pixel which corresponds to neither an edge pixel nor a non-edge pixel, the determination using the focus-pixel signal and bordering pixel-signals supplied by the matrix preparing unit, and the determination being performed by comparing the intensity of the second pixel with each of the intensities of each of the first pixels and the focus pixel, and for outputting a control signal indicating the above determined condition of the focus pixel;

enhancing unit for enhancing the focus pixel-signal supplied by the matrix preparing unit by applying a predetermined enhancing process thereto, and for outputting an enhanced pixel signal;

smoothing unit for smoothing the focus pixel-signal supplied by the matrix preparing unit by applying a predetermined enhancing process thereto, and for outputting a smoothed pixel signal;

selecting unit for selecting a pixel signal, in accordance with the control signal supplied by the determining unit, from among the focus-pixel signal supplied by the matrix preparing unit, the enhanced pixel signal supplied by the enhancing unit and the smoothed pixel signal supplied by the smoothing unit, the enhanced pixel signal being output as a selected pixel signal when the control signal indicates that the focus pixel is an edge pixel, the smoothed pixel signal being output as a selected signal when the control signal indicates that the focus pixel is a non-edge pixel, and the focus pixel signal being output when the control signal indicates that the focus pixel is a pixel other than an edge pixel and non-edge pixel; and processing unit for processing the selected pixel-signal supplied by the selecting unit by applying a half-tone binarizing process, and for outputting the binary image signal.

Other objects, features and advantages of the present invention will become more apparent from the following detailed description when read in conjunction with the accompanying drawings.

BRIEF DESCRIPTION OF THE DRAWINGS

FIG. 1 is an illustration of a pixel matrix used in an image processing operation according to the present invention;

FIGS. 2A to 2P are illustrations of pixel matrix patterns for explaining a determination of an edge pixel;

FIGS. 3A to 3P are illustrations of pixel matrix patterns for explaining a determination of an edge pixel;

FIG. 4 is a block diagram of a first embodiment of an image processing device according to the present invention.

DETAILED DESCRIPTION OF THE PREFERRED EMBODIMENTS

Figure 5:
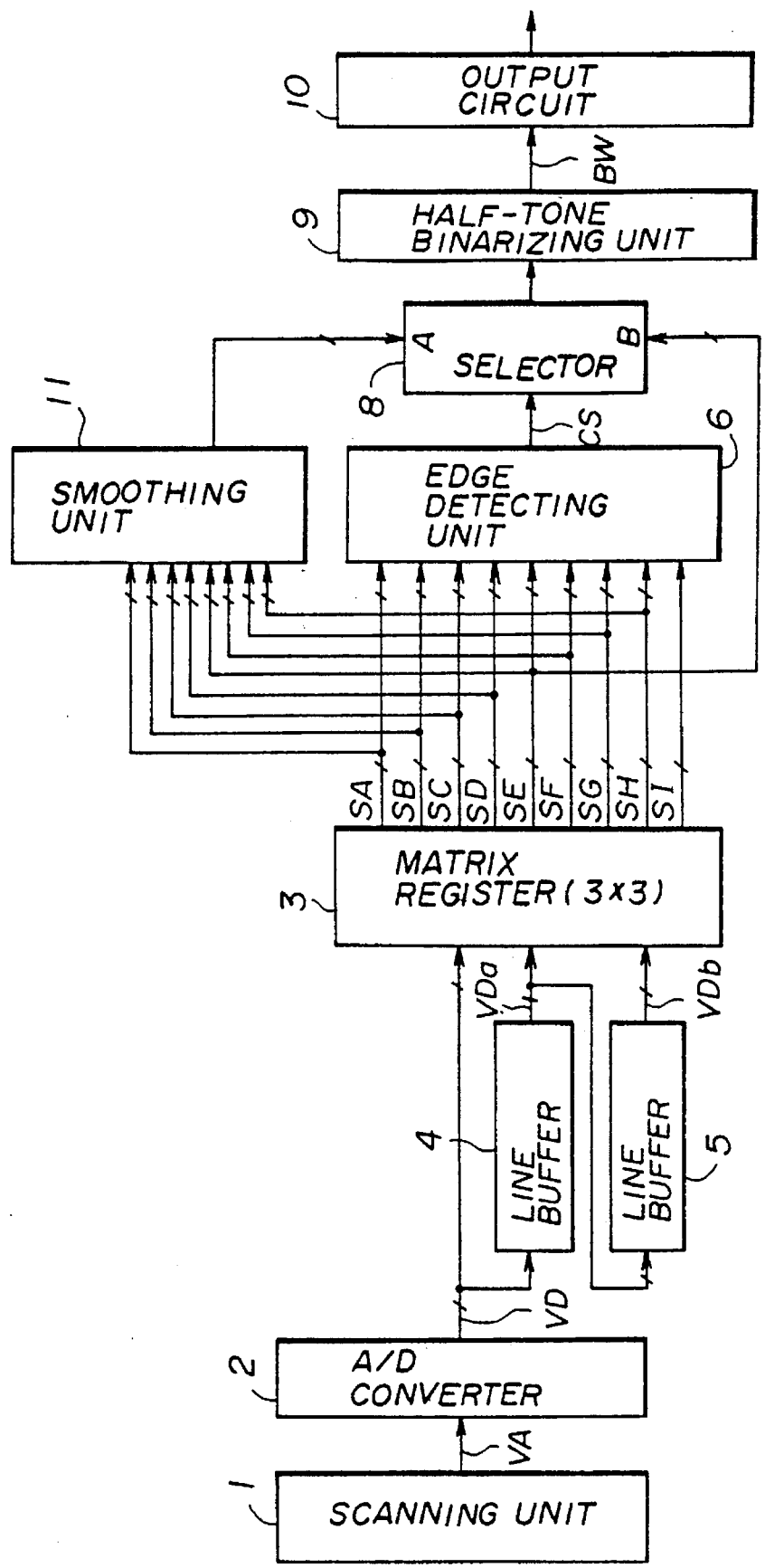
FIG. 5 is a block diagram of a second embodiment of an image processing device according to the present invention.

A description will now be given of an edge detecting method used in the present invention. In the present invention, a 3 by 3 pixel matrix, as shown in FIG. 1, is applied to data of a gray-scale image (gray-scale image data). The pixel E, positioned in the center of the matrix, is determined as a focus pixel, which is a pixel under consideration of a possible edge pixel. Pixels A~D and F~I are determined as bordering pixels to be used as reference pixels in the edge pixel detection process.

In a case where an intensity of each pixel in the pixel matrix corresponds one of pixel matrix patterns shown in FIGS. 2A to 2P, the focus pixel is determined to be an edge pixel. In FIGS. 2A to 2P, a letter B represents a black pixel, a letter W a white pixel, and a letter X either a black or white pixel.

A matrix shown in FIG. 2A has a pattern in which the focus pixel E is white and three consecutive bordering pixels A, B and C are black; in this case the focus pixel E is determined to be as an edge pixel. A matrix shown in FIG. 2B has a pattern in which the focus pixel E is white and three consecutive bordering pixels A, B and D are black; in this case the focus pixel E is determined to be an edge pixel. A matrix shown in FIG. 2C has a pattern in which the focus pixel E is black and three consecutive bordering pixels A, B and C are white; in this case the focus pixel E is determined to be an edge pixel. A matrix shown in FIG. 2D has a pattern in which the focus pixel E is black and three consecutive bordering pixels A, B and D are white; in this case the focus pixel E is determined to be an edge pixel.

A matrix shown in FIG. 2E has a pattern in which the focus pixel E is white and three consecutive bordering pixels A, D and G are black; in this case the focus pixel E is determined to be an edge pixel. A matrix shown in FIG. 2F has a pattern in which the focus pixel E is white and three consecutive bordering pixels D, G and H are black; in this case the focus pixel E is determined to be an edge pixel. A matrix shown in FIG. 2G has a pattern in which the focus pixel E is black and three consecutive bordering pixels A, D and G are white; in this case the focus pixel E is determined to be an edge pixel. A matrix shown in FIG. 2H has a pattern in which the focus pixel E is black and three consecutive bordering pixels D, G and H are white; in this case the focus pixel E is determined to be an edge pixel.

A matrix shown in FIG. 2I has a pattern in which the focus pixel E is white and three consecutive bordering pixels G, H and I are black; in this case the focus pixel E is determined to be an edge pixel. A matrix shown in FIG. 2J has a pattern in which the focus pixel E is white and three consecutive bordering pixels H, I and F are black; in this case the focus pixel E is determined to be an edge pixel. A matrix shown in FIG. 2K has a pattern in which the focus pixel E is black and three consecutive bordering pixels G, H and I are white; in this case the focus pixel E is determined to be an edge pixel. A matrix shown in FIG. 2L has a pattern in which the focus pixel E is black and three consecutive bordering pixels H, I and F are white; in this case the focus pixel E is determined to be an edge pixel.

A matrix shown in FIG. 2M has a pattern in which the focus pixel E is white and three consecutive bordering pixels C, F and I are black; in this case the focus pixel E is determined to be an edge pixel. A matrix shown in FIG. 2N has a pattern in which the focus pixel E is white and three consecutive bordering pixels B, C and F are black; in this case the focus pixel E is determined to be an edge pixel. A matrix shown in FIG. 2O has a pattern in which the focus pixel E is black and three consecutive bordering pixels C, F and I are white; in this case the focus pixel E is determined to be an edge pixel. A matrix shown in FIG. 2P has a pattern in which the focus pixel E is black and three consecutive bordering pixels B, C and F are white; in this case the focus pixel E is determined to be an edge pixel.

These pixel patterns are basically examined by using the following logical expression (I). It should be noted that the following logical expressions are written out rather than expressed in mathematical notation for ease of understanding. Additionally, letters A–I represent either a pixel itself or an intensity of a pixel, and Th represents a predetermined intensity threshold value.

If expression (1) is true, or expression (2) is true, or expression (3) is true, or expression (4) is true, the pixel E is an edge pixel; and in other cases the pixel is not an edge pixel . . . (I)

When the pixel patterns shown in FIGS. 2A to 2D are examined, expressions (1) to (4) in expression (I) are respectively substituted by expressions (1a) to (4a) below.

$$\{(A-E)>Th\} \text{ is true, and } \{(B-E)>Th\} \text{ is true, and } \{(C-E)>Th\} \text{ is true.} \qquad (1a)$$

$$\{(A-E)>Th\} \text{ is true, and } \{(B-E)>Th\} \text{ is true, and } \{(D-E)>Th\} \text{ is true.} \qquad (2a)$$

$$\{(E-A)>Th\} \text{ is true, and } \{(E-B)>Th\} \text{ is true, and } \{(E-C)>Th\} \text{ is true.} \qquad (3a)$$

$$\{(E-A)>Th\} \text{ is true, and } \{(E-B)>Th\} \text{ is true, and } \{(E-D)>Th\} \text{ is true.} \qquad (4a)$$

When the pixel patterns shown in FIGS. 2E to 2H are examined, expressions (1) to (4) in expression (I) are respectively substituted by expressions (1b) to (4b) below.

$$\{(A-E)>Th\} \text{ is true, and } \{(D-E)>Th\} \text{ is true, and } \{(C-E)>Th\} \text{ is true.} \qquad (1b)$$

$$\{(D-E)>Th\} \text{ is true, and } \{(G-E)>Th\} \text{ is true, and } \{(H-E)>Th\} \text{ is true.} \qquad (2b)$$

$$\{(E-A)>Th\} \text{ is true, and } \{(E-D)>Th\} \text{ is true, and } \{(G-C)>Th\} \text{ is true.} \qquad (3b)$$

$$\{(E-D)>Th\} \text{ is true, and } \{(E-G)>Th\} \text{ is true, and } \{(H-D)>Th\} \text{ is true.} \qquad (4b)$$

When the pixel patterns shown in FIGS. 2I to 2L are examined, expressions (1) to (4) in expression (I) are respectively substituted by expressions (1c) to (4c) below.

$$\{(G-E)>Th\} \text{ is true, and } \{(H-E)>Th\} \text{ is true, and } \{(I-E)>Th\} \text{ is true.} \qquad (1c)$$

$$\{(F-E)>Th\} \text{ is true, and } \{(H-E)>Th\} \text{ is true, and } \{(I-E)>Th\} \text{ is true.} \qquad (2c)$$

$$\{(E-G)>Th\} \text{ is true, and } \{(E-H)>Th\} \text{ is true, and } \{(E-I)>Th\} \text{ is true.} \qquad 3c)$$

$$\{(E-F)>Th\} \text{ is true, and } \{(E-H)>Th\} \text{ is true, and } \{(E-I)>Th\} \text{ is true.} \qquad (4c)$$

When the pixel patterns shown in FIGS. 2M to 2P are examined, expressions (1) to (4) in expression (I) are respectively substituted by expressions (1d) to (4d) below.

$$\{(C-E) > Th\} \text{ is true, and } \{(F-E) > Th\} \text{ is true, and } \{(I-E) > Th\} \text{ is true.} \tag{1d}$$

$$\{(B-E) > Th\} \text{ is true, and } \{(C-E) > Th\} \text{ is true, and } \{(F-E) > Th\} \text{ is true.} \tag{2d}$$

$$\{(E-C) > Th\} \text{ is true, and } \{(E-F) > Th\} \text{ is true, and } \{(E-I) > Th\} \text{ is true.} \tag{3d}$$

$$\{(E-B) > Th\} \text{ is true, and } \{(E-C) > Th\} \text{ is true, and } \{(E-F) > Th\} \text{ is true.} \tag{4d}$$

In the pixel patterns shown in FIGS. 2A to 2P, it is determined whether or not a pixel is an edge pixel using the above expressions by comparing the focus pixel with three consecutively arranged bordering pixels. Accordingly, erroneous determination of an edge pixel can be prevented when a pixel derived from an image comprised of relatively small dots, such as a mesh picture, is examined.

Additionally, an edge pixel can be detected even though the threshold value Th is set to a small value. This results in that the edge detection can be appropriately performed even if an original having a surface other than white is scanned.

FIGS. 3A to 3P shows other pixel patterns by which the focus pixel E may also be determined to be an edge pixel.

A matrix shown in FIG. 3A has a pattern in which the bordering pixel B is white, and the bordering pixel D, the focus pixel E and the bordering pixel F, these three pixels being consecutively arranged, are black; in this case the focus pixel E is determined to be an edge pixel. A matrix shown in FIG. 3B has a pattern in which the bordering pixel A is white, and the bordering pixel C, the focus pixel E and the bordering pixel G, these three pixels being consecutively arranged, are black; in this case the focus pixel E is determined to be an edge pixel. A matrix shown in FIG. 3C has a pattern in which the bordering pixel B is black, and the bordering pixel D, the focus pixel E and the bordering pixel F, these three pixels being consecutively arranged, are white; in this case the focus pixel E is determined to be an edge pixel. A matrix shown in FIG. 3D has a pattern in which the bordering pixel A is black, and the bordering pixel C, the focus pixel E and the bordering pixel G, these three pixels being consecutively arranged, are white; in this case the focus pixel E is determined to be an edge pixel.

A matrix shown in FIG. 3E has a pattern in which the bordering pixel D is white, and the bordering pixel B, the focus pixel E and the bordering pixel H, these three pixels being consecutively arranged, are black; in this case the focus pixel E is determined to be an edge pixel. A matrix shown in FIG. 3F has a pattern in which the bordering pixel G is white, and the bordering pixel A, the focus pixel E and the bordering pixel I, these three pixels being consecutively arranged, are black; in this case the focus pixel E is determined to be an edge pixel. A matrix shown in FIG. 3G has a pattern in which the bordering pixel D is black, and the bordering pixel B, the focus pixel E and the bordering pixel H, these three pixels being consecutively arranged, are white; in this case the focus pixel E is determined to be an edge pixel. A matrix shown in FIG. 3H has a pattern in which the bordering pixel G is black, and the bordering pixel A, the focus pixel E and the bordering pixel I, these three pixels being consecutively arranged, are white; in this case the focus pixel E is determined to be an edge pixel.

A matrix shown in FIG. 3I has a pattern in which the bordering pixel H is white, and the bordering pixel D, the focus pixel E and the bordering pixel F, these three pixels being consecutively arranged, are black; in this case the focus pixel E is determined to be an edge pixel. A matrix shown in FIG. 3J has a pattern in which the bordering pixel I is white, and the bordering pixel C, the focus pixel E and the bordering pixel G, these three pixels being consecutively arranged, are black; in this case the focus pixel E is determined to be an edge pixel. A matrix shown in FIG. 3K has a pattern in which the bordering pixel H is black, and the bordering pixel D, the focus pixel E and the bordering pixel F, these three pixels being consecutively arranged, are white; in this case the focus pixel E is determined to be an edge pixel. A matrix shown in FIG. 3L has a pattern in which the bordering pixel I is black, and the bordering pixel C, the focus pixel E and the bordering pixel G, these three pixels being consecutively arranged, are white; in this case the focus pixel E is determined to be an edge pixel.

A matrix shown in FIG. 3M has a pattern in which the bordering pixel F is white, and the bordering pixel B, the focus pixel E and the bordering pixel H, these three pixels being consecutively arranged, are black; in this case the focus pixel E is determined to be an edge pixel. A matrix shown in FIG. 3N has a pattern in which the bordering pixel C is white, and the bordering pixel A, the focus pixel E and the bordering pixel I, these three pixels being consecutively arranged, are black; in this case the focus pixel E is determined to be an edge pixel. A matrix shown in FIG. 3O has a pattern in which the bordering pixel F is black, and the bordering pixel B, the focus pixel E and the bordering pixel H, these three pixels being consecutively arranged, are white; in this case the focus pixel E is determined to be an edge pixel. A matrix shown in FIG. 3P has a pattern in which the bordering pixel C is black, and the bordering pixel A, the focus pixel E and the bordering pixel I, these three pixels being consecutively arranged, are white; in this case the focus pixel E is determined to be an edge pixel.

These pixel patterns are basically examined using the above-mentioned logical expression (I). It should be noted that the following logical expressions are written out rather than expressed in mathematical notation for ease of understanding. Additionally, letters A–I represent either a pixel itself or an intensity of a pixel, and Th represents a predetermined intensity threshold value.

When the pixel patterns shown in FIGS. 3A to 3D are examined, expressions (1) to (4) in expression (I) are respectively substituted by expressions (1a') to (4a') below.

$$\{(D-B) > Th\} \text{ is true, and } \{(E-B) > Th\} \text{ is true, and } \{(F-B) > Th\} \text{ is true.} \tag{1a'}$$

$$\{(C-A) > Th\} \text{ is true, and } \{(E-A) > Th\} \text{ is true, and } \{(G-A) > Th\} \text{ is true.} \tag{2a'}$$

$$\{(B-D) > Th\} \text{ is true, and } \{(B-E) > Th\} \text{ is true, and } \{(B-F) > Th\} \text{ is true.} \tag{3a'}$$

$$\{(A-C) > Th\} \text{ is true, and } \{(A-E) > Th\} \text{ is true, and } \{(A-G) > Th\} \text{ is true.} \tag{4a'}$$

When the pixel patterns shown in FIGS. 3E to 3H are examined, expressions (1) to (4) in expression (I) are respectively substituted by expressions (1b') to (4b') below.

$$\{(B-D) > Th\} \text{ is true, and } \{(E-D) > Th\} \text{ is true, and } \{(H-D) > Th\} \text{ is true.} \tag{1b'}$$

$$\{(A-G) > Th\} \text{ is true, and } \{(E-G) > Th\} \text{ is true, and } \{(I-G) > Th\} \text{ is true.} \tag{2b'}$$

$$\{(D-B) > Th\} \text{ is true, and } \{(D-E) > Th\} \text{ is true, and } \{(D-H) > Th\} \text{ is true.} \tag{3b'}$$

$$\{(G-A) > Th\} \text{ is true, and } \{(G-E) > Th\} \text{ is true, and } \{(G-I) > Th\} \text{ is true.} \tag{4b'}$$

When the pixel patterns shown in FIGS. 3I to 3L are examined, expressions (1) to (4) in expression (I) are respectively substituted by expressions (1c') to (4c') below.

$\{(D-H)>Th\}$ is true, and $\{(E-H)>Th\}$ is true, and $\{(F-H)>Th\}$ is true. (1c')

$\{(C-I)>Th\}$ is true, and $\{(E-I)>Th\}$ is true, and $\{(G-I)>Th\}$ is true. (2c')

$\{(H-D)>Th\}$ is true, and $\{(H-E)>Th\}$ is true, and $\{(H-F)>Th\}$ is true. (3c')

$\{(I-C)>Th\}$ is true, and $\{(I-E)>Th\}$ is true, and $\{(I-G)>Th\}$ is true. (4c')

When the pixel patterns shown in FIGS. 3M to 3P are examined, expressions (1) to (4) in expression (I) are respectively substituted by expressions (1d') to (4d') below.

$\{(B-F)>Th\}$ is true, and $\{(E-F)>Th\}$ is true, and $\{(H-F)>Th\}$ is true. (1d')

$\{(A-C)>Th\}$ is true, and $\{(E-C)>Th\}$ is true, and $\{(I-C)>Th\}$ is true. (2d')

$\{(F-B)>Th\}$ is true, and $\{(F-E)>Th\}$ is true, and $\{(F-H)>Th\}$ is true. (3d')

$\{(C-A)>Th\}$ is true, and $\{(C-E)>Th\}$ is true, and $\{(C-I)>Th\}$ is true. (4d')

In the pixel patterns shown in FIGS. 3A to 3P, it is determined whether or not a pixel is an edge pixel, using the above expressions, by comparing the focus pixel with three consecutively arranged bordering pixels. Accordingly, effects similar to those obtained when using FIGS. 2A to 2P can be obtained.

A description will now be given, with reference to FIG. 4, of a structure of a first embodiment of an image processing device according to the present invention. FIG. 4 is a block diagram of the first embodiment of the image processing device according to the present invention.

In FIG. 4, a scanning unit 1 scans an original, and the obtained image information is broken down into pixels having a predetermined resolution. The scanning unit 1 generates electric signals corresponding to the intensities of each of the respective pixels, and outputs the signals, which are analog image signals VA, in the order of scanning. The analog image signals VA output from the scanning unit 1 are supplied to an analog/digital converter 2.

The analog/digital converter 2 converts the analog image signals VA into digital image signals VD comprising a predetermined number of bits. The digital image signals VD are supplied to both a matrix register 3 and a line buffer 4.

The line buffer 4 comprises a data buffer in which digital image signals VD corresponding to one scanning line are broken down into pixel units so that the digital image signals VD can be stored. The output signals from the line buffer 4, which are digital image signals VDa, are supplied to the matrix register 3 and a line buffer 5. The digital image signals VDa are signals corresponding to data one scanning line prior to the data of the digital image signals VD.

The line buffer 5 comprises a FIFO (First In First Out) buffer which stores the digital image signals VDa output from the line buffer 4, and outputs digital image signal VDb corresponding to one scanning line of the data to the matrix register 3. The digital image data VDb is signals corresponding one scanning line prior to the digital image signals VDa.

The matrix register 3 is provided for forming the digital image signals VD in each 3*3 matrix. that is, three pixels in the primary main scanning direction and three pixels in the secondary scanning direction. The matrix register 3 outputs the digital image signals DV corresponding to each position of the pixel matrix, A, B, C, D, E, F, G, H and I, as signals SA, SB, SC, SD, SF, SE, SF, SG, SH and SI. The signals SA, SC, SG and SH are supplied to an edge detecting unit 6. The signals SB, SD, SF and SI are supplied to the edge detecting unit 6 and an edge enhancing unit 7. The signal SE is supplied to the edge detecting unit 6, the edge enhancing unit 7 and an input terminal A of a selector 8.

The edge detecting unit 6 performs an edge detecting operation for the focus pixel E by using the signals SA, SB, SC, SD, SE, SF, SG, SH and SI in accordance with the edge examining process described with respect to the pixel matrices shown in FIGS. 2A to 2P or in accordance with the edge examining process described with respect to the pixel matrices shown in FIGS. 3A to 3P. When it is determined that the focus pixel E is an edge pixel, a control signal CS supplied to the selector 8 is set to logic H level.

The edge enhancing unit 7 performs a correction of blurs of the focus pixel E, that is, the unit 7 enhances the edge pixel, in accordance with, for example, the MTF correction process illustrated by the following equation (II). An output signal of the edge enhancing unit 7 is supplied to an input terminal B of the selector 8.

$$E'=3E-(B+D'F+H)/Z \qquad (II)$$

Where E', which corresponds to an output signal of the edge enhancing unit 7, is a signal value of the focus pixel E after being corrected by means of the MTF process.

The signal SE supplied to the input terminal A of the selector 8 is selected and output to a half-tone binarizing unit 9 when the control signal supplied by the edge detecting unit 6 is at logic L level. When the control signal CS is at logic H level, the selector 8 selects the signal supplied by the edge enhancing unit 7 to the input terminal B and output a signal to the half-tone binarizing unit 9.

The half-tone binarizing unit 9 generates a half-tone binary signal BW corresponding to an input signal in accordance with a known half tone binarizing process. The half-tone binary signal BW is output to a next device via an output circuit 10. As a half-tone binarizing process, there has been suggested, for example, the dither matrix method in which a binarizing process is performed using a threshold value applied to a systematic dither matrix; or the error diffusion method, in which intensity dispersion, caused in the binarizing process using a threshold value, is diffused to surrounding pixels.

When a scanning of an original is started in the above-mentioned structure, the analog image signals VA are output to the A/D converter 2 consecutively, and corresponding digital image signals VD are output from the A/D converter to the matrix register 3 and the line buffer 4.

Additionally, the digital image signal VDa having a scanning position corresponding to that of the digital image signal VD one scanning line ahead is output from the line buffer 4 and supplied to the matrix register 3 and the line buffer 5.

Further, the digital image signal VDb having a scanning position corresponding to that of the digital image signal VDa one line ahead, that is, two lines ahead of the digital image signals VD, is output from the line buffer 5 and supplied to the matrix register 3.

Every time the digital image signals VD, VDa and VDb are broken down into pixel units, the matrix register 3 renews the 3*3 pixel matrix signals SA, SB, SC, SD, SE, SF, SG, SH and SI, of the matrix having the focus pixel E positioned at the center thereof.

Accordingly, the signals SA, SB, SC, SD, SE, SF, SG, SH and SI that correspond to the focus pixel E currently being processed are supplied to the edge detecting unit 6. The signals SB, SD, SE and SI that correspond to the focus pixel being currently processed are supplied to the edge enhancing unit 7. The signal SE corresponding to the focus pixel currently being processed is supplied to the input terminal A of the selector 8.

The edge enhancing unit 7 performs the above-mentioned MTF correction process in accordance with the input signals SB, SD, SE and SI and outputs the results to the input terminal B of the selector 8.

The edge detecting unit 6 performs an examining operation for detecting an edge pixel in accordance with the input signals SA, SB, SC, SD, SE, SF, SG, SH and SI. The edge detecting unit 6 sets the control signal CS to logic H level when the focus pixel E is determined to be an edge pixel, and sets the control signal to logic L level when the focus pixel is not determined to be an edge pixel.

Accordingly, for a pixel determined to be an edge pixel, the selector 8 selects and outputs to the half-tone binarizing unit 9 the signal enhanced by the edge enhancing unit 7. For a pixel not determined to be an edge pixel, the selector 8 selects and outputs to the half-tone binarizing unit 9 the unenhanced signal SE.

The half-tone binarizing unit 9 performs a predetermined half-tone process, in accordance with the input signals, and outputs the results thereof as a half-tone binary signal BW. The half-tone binary signal BW is output to a next device via an output circuit 10.

In this manner, for a pixel determined to be an edge pixel, an enhanced signal is input to the half-tone binarizing unit 9, while for a pixel that is determined to not be an edge pixel a signal that is not enhanced is input to the half-tone binarizing unit 9. Thus a clear picture can be obtained in a reproduced image of a non-half-tone image in accordance with the half-tone binary signals BW resulting in an improvement in the reproduced picture quality.

Additionally, since the edge examination procedure for determining an edge pixel is performed in accordance with the pixel matrix patterns shown in FIGS. 2A through 2P and FIGS. 3A through 3B, determination of a pixel corresponding to a moiré of a mesh picture as an edge pixel can be prevented. Accordingly, a moiré of a mesh picture is not enhanced in the reproduction of a picture in accordance with the half-tone binary signals BW. As a result, a good quality reproduced image can be obtained for an original corresponding to either a character or a drawing picture.

FIG. 5 is a block diagram of a second embodiment of the image processing device according to the present invention. In FIG. 5, parts that are the same as the parts shown in FIG. 4 are given the same reference numerals from figure to figure, and descriptions thereof will be omitted.

In FIG. 5, signals SA, SB, SC, SD, SE, SF, SG and SI, output from a matrix register 3, are supplied to a smoothing unit 11. The smoothing unit 11 performs a smoothing process for the focus pixel E, for example as shown by the equation (III) below. A signal output from the smoothing unit 11 is supplied to an input terminal of a selector 8. A signal SE output from the matrix register 3 is supplied to an input terminal of the selector 8.

$$E' = (A+B+C+D+E+F+G+H)/8 \quad \text{(III)}$$

Where E', corresponding to an output signal of the smoothing unit 11, is a signal value of the focus pixel E after the smoothing is carried out.

In this embodiment, data of a pixel not determined to be an edge pixel is supplied to a half-tone binarizing unit 9 after being smoothed by the smoothing unit 11. Thus a clear picture can be obtained in a reproduced image without having a moiré of a mesh picture. Thus improvement in the picture quality of reproduced images can be obtained.

Additionally, since for a pixel determined to be an edge pixel only signals which have not been smoothed are input to the half-tone binarizing unit 9, deterioration of the quality of a non-half-tone image, such as a character, which determination conventionally appears in a picture reproduced by the half-tone binary signals BW, is prevented.

In this embodiment, a half-tone binarizing process is performed after determining whether or not a pixel is an edge pixel, and an appropriate process is applied to the respective pixel based on whether it is an edge pixel or a pixel other than edge pixel. However, depending on a form of an image, there is a possibility that there may be a pixel that cannot be clearly classified as either an edge pixel or a non-edge pixel.

In this case, better picture quality of a reproduced picture can be obtained by classifying pixels into three types: an edge pixel, a non-edge pixel and a pixel other than edge pixel and a non-edge pixel, and applying an appropriate image processing procedure to each classified type.

When classifying a pixel into one of the above-mentioned three types, the following expression is basically applied to the thirty-two matrix patterns shown in FIGS. 2A to 2P and FIGS. 3A to 3P.

If expression (5) is true, E is an edge pixel; if not, and if expression (6) is true, E is an unclassifiable pixel; in other cases, E is a non-edge pixel . . . (IV)

It should be noted that T1 and T2 in the following expressions are predetermined threshold values, and that there is a relationship therebetween such that T1 is greater than T2.

When the matrix pattern shown in FIG. 2A is classified into the three types, expressions (5) and (6) in the above mentioned expression (IV) are substituted by the following expressions (5-1) and (6-1), the expression (IV) is then used in the classification operation.

$$\{(A-E) > T1\} \text{ is true, and } \{(B-E) > T1\} \text{ is true, and } \{(C-E) > T1\} \text{ is true.} \quad (5-1)$$

$$\{T1 \geq (A-E) > T2\} \text{ is true, and } \{T1 \geq (B-E) > T2\} \text{ is true, and } \{T1 \geq (C-E) > T2\} \text{ is true.} \quad (6-1)$$

When the matrix pattern shown in FIG. 2B is classified into the three types, expressions (5) and (6) in the above mentioned expression (IV) are substituted by the following expressions (5-2) and (6-2), the expression (IV) is then used in the classification operation.

$$\{(A-E) > T1\} \text{ is true, and } \{(B-E) > T1\} \text{ is true, and } \{(D-E) > T1\} \text{ is true.} \quad (5-2)$$

$$\{T1 \geq (A-E) > T2\} \text{ is true, and } \{T1 \geq (B-E) > T2\} \text{ is true, and } \{T1 \geq (D-E) > T2\} \text{ is true.} \quad (6-2)$$

When the matrix pattern shown in FIG. 2C is classified into the three types, expressions (5) and (6) in the above mentioned expression (IV) are substituted by the following expressions (5-3) and (6-3), the expression (IV) is then used in the classification operation.

$$\{(E-A) > T1\} \text{ is true, and } \{(E-B) > T1\} \text{ is true, and } \{(E-C) > T1\} \text{ is true.} \quad (5-3)$$

$$\{T1 \geq (E-A) > T2\} \text{ is true, and } \{T1 \geq (E-B) > T2\} \text{ is true, and } \{T1 \geq (E-C) > T2\} \text{ is true.} \quad (6-3)$$

When the matrix pattern shown in FIG. 2D is classified into the three types, expressions (5) and (6) in the above mentioned expression (IV) are substituted by the following expressions (5-4) and (6-4), the expression (IV) is then used in the classification operation.

$$\{(E-A)>T1\} \text{ is true, and } \{(E-B)>T1\} \text{ is true, and } \{(E-D)>T1\} \text{ is true.} \quad (5\text{-}4)$$

$$\{T1\geq(E-A)>T2\} \text{ is true, and } \{T1\geq(E-B)>T2\} \text{ is true, and } \{T1\geq(E-D)>T2\} \text{ is true.} \quad (6\text{-}4)$$

When the matrix pattern shown in FIG. 2E is classified into the three types, expressions (5) and (6) in the above mentioned expression (IV) are substituted by the following expressions (5-5) and (6-5), the expression (IV) is then used in the classification operation.

$$\{(A-E)>T1\} \text{ is true, and } \{(D-E)>T1\} \text{ is true, and } \{(G-E)>T1\} \text{ is true.} \quad (5\text{-}5)$$

$$\{T1\geq(A-E)>T2\} \text{ is true, and } \{T1\geq(D-E)>T2\} \text{ is true, and } \{T1\geq(G-E)>T2\} \text{ is true.} \quad (6\text{-}1)$$

When the matrix pattern shown in FIG. 2F is classified into the three types, expressions (5) and (6) in the above mentioned expression (IV) are substituted by the following expressions (5-6) and (6-6), the expression (IV) is then used in the classification operation.

$$\{(D-E)>T1\} \text{ is true, and } \{(G-E)>T1\} \text{ is true, and } \{(H-E)>T1\} \text{ is true.} \quad (5\text{-}6)$$

$$\{T1\geq(D-E)>T2\} \text{ is true, and } \{T1\geq(G-E)>T2\} \text{ is true, and } \{T1\geq(H-E)>T2\} \text{ is true.} \quad (6\text{-}6)$$

When the matrix pattern shown in FIG. 2G is classified into the three types, expressions (5) and (6) in the above mentioned expression (IV) are substituted by the following expressions (5-7) and (6-7), the expression (IV) is then used in the classification operation.

$$\{(E-A)>T1\} \text{ is true, and } \{(E-D)>T1\} \text{ is true, and } \{(E-G)>T1\} \text{ is true.} \quad (5\text{-}7)$$

$$\{T1\geq(E-A)>T2\} \text{ is true, and } \{T1\geq(E-D)>T2\} \text{ is true, and } \{T1\geq(E-G)>T2\} \text{ is true.} \quad (6\text{-}7)$$

When the matrix pattern shown in FIG. 2H is classified into the three types, expressions (5) and (6) in the above mentioned expression ((IV)) are substituted by the following expressions (5-8) and (6-8), the expression (IV) is then used in the classification operation.

$$\{(E-D)>T1\} \text{ is true, and } \{(E-G)>T1\} \text{ is true, and } \{(E-H)>T1\} \text{ is true.} \quad (5\text{-}8)$$

$$\{T1\geq(E-D)>T2\} \text{ is true, and } \{T1\geq(E-G)>T2\} \text{ is true, and } \{T1\geq(E-H)>T2\} \text{ is true.} \quad (6\text{-}8)$$

When the matrix pattern shown in FIG. 2I is classified into the three types, expressions (5) and (6) in the above mentioned expression (IV) are substituted by the following expressions (5-9) and (6-9), the expression (IV) is then used in the classification operation.

$$\{(G-E)>T1\} \text{ is true, and } \{(H-E)>T1\} \text{ is true, and } \{(I-E)>T1\} \text{ is true.} \quad (5\text{-}9)$$

$$\{T1\geq(G-E)>T2\} \text{ is true, and } \{T1\geq(H-E)>T2\} \text{ is true, and } \{T1\geq(I-E)>T2\} \text{ is true.} \quad (6\text{-}9)$$

When the matrix pattern shown in FIG. 2J is classified into the three types, expressions (5) and (6) in the above mentioned expression (IV) are substituted by the following expressions (5-10) and (6-10), the expression (IV) is then used in the classification operation.

$$\{(F-E)>T1\} \text{ is true, and } \{(H-E)>T1\} \text{ is true, and } \{(I-E)>T1\} \text{ is true.} \quad (5\text{-}10)$$

$$\{T1\geq(F-E)>T2\} \text{ is true, and } \{T1\geq(H-E)>T2\} \text{ is true, and } \{T1\geq(I-E)>T2\} \text{ is true.} \quad (6\text{-}10)$$

When the matrix pattern shown in FIG. 2K is classified into the three types, expressions (5) and (6) in the above mentioned expression (IV) are substituted by the following expressions (5-11) and (6-11), the expression (IV) is then used in the classification operation.

$$\{(E-G)>T1\} \text{ is true, and } \{(E-H)>T1\} \text{ is true, and } \{(E-I)>T1\} \text{ is true.} \quad (5\text{-}11)$$

$$\{T1\geq(E-G)>T2\} \text{ is true, and } \{T1\geq(E-H)>T2\} \text{ is true, and } \{T1-(E-I)>T2\} \text{ is true.} \quad (6\text{-}11)$$

When the matrix pattern shown in FIG. 2L is classified into the three types, expressions (5) and (6) in the above mentioned expression (IV) are substituted by the following expressions (5-12) and (6-12), the expression (IV) is then used in the classification operation.

$$\{(E-F)>T1\} \text{ is true, and } \{(E-H)>T1\} \text{ is true, and } \{(E-I)>T1\} \text{ is true.} \quad (5\text{-}12)$$

$$\{T1\geq(E-F)>T2\} \text{ is true, and } \{T1\geq(E-H)>T2\} \text{ is true, and } \{T1\geq(E-I)>T2\} \text{ is true.} \quad (6\text{-}12)$$

When the matrix pattern shown in FIG. 2M is classified into the three types, expressions (5) and (6) in the above mentioned expression (IV) are substituted by the following expressions (5-13) and (6-13), the expression (IV) is then used in the classification operation.

$$\{(C-E)>T1\} \text{ is true, and } \{(F-E)>T1\} \text{ is true, and } \{(I-E)>T1\} \text{ is true.} \quad (5\text{-}13)$$

$$\{T1\geq(C-E)>T2\} \text{ is true, and } \{T1\geq(F-E)>T2\} \text{ is true, and } \{T1\geq(I-E)>T2\} \text{ is true.} \quad (6\text{-}13)$$

When the matrix pattern shown in FIG. 2N is classified into the three types, expressions (5) and (6) in the above mentioned expression (IV) are substituted by the following expressions (5-14) and (6-14), the expression (IV) is then used in the classification operation.

$$\{(B-E)>T1\} \text{ is true, and } \{(C-E)>T1\} \text{ is true, and } \{(F-E)>T1\} \text{ is true.} \quad (5\text{-}14)$$

$$\{T1\geq(B-E)>T2\} \text{ is true, and } \{T1\geq(C-E)>T2\} \text{ is true, and } \{T1\geq(F-E)>T2\} \text{ is true.} \quad (6\text{-}14)$$

When the matrix pattern shown in FIG. 2O is classified into the three types, expressions (5) and (6) in the above mentioned expression (IV) are substituted by the following expressions (5-15) and (6-15), the expression (IV) is then used in the classification operation.

$$\{(E-C)>T1\} \text{ is true, and } \{(E-F)>T1\} \text{ is true, and } \{(E-I)>T1\} \text{ is true.} \quad (5\text{-}15)$$

$$\{T1\geq(E-C)>T2\} \text{ is true, and } \{T1\geq(E-F)>T2\} \text{ is true, and } \{T1\geq(E-I)>T2\} \text{ is true.} \quad (6\text{-}15)$$

When the matrix pattern shown in FIG. 2P is classified into the three types, expressions (5) and (6) in the above mentioned expression (IV) are substituted by the following expressions (5-16) and (6-16), the expression (IV) is then used in the classification operation.

$$\{(E-B)>T1\} \text{ is true, and } \{(E-C)>T1\} \text{ is true, and } \{(E-F)>T1\} \text{ is true.} \quad (5\text{-}16)$$

{T1≧(E−B)>T2} is true, and {T1≧(E−C)>T2} is true, and
{T1≧(E−F)>T2} is true. (6-16)

When the matrix pattern shown in FIG. 3A is classified into the three types, expressions (5) and (6) in the above mentioned expression (IV) are substituted by the following expressions (5-17) and (6-17), the expression (IV) is then used in the classification operation.

{(D−B)>T1} is true, and {(E−B)>T1} is true, and {(F−B)>T1} is true. (5-17)

{T1≧(D−B)>T2} is true, and {T1≧(E−B)>T2} is true, and
{T1≧(F−B)>T2} is true. (6-17)

When the matrix pattern shown in FIG. 3B is classified into the three types, expressions (5) and (6) in the above mentioned expression (IV) are substituted by the following expressions (5-18) and (6-18), the expression (IV) is then used in the classification operation.

{(C−A)>T1} is true, and {(E−A)>T1} is true, and {(G−A)>T1} is true. (5-18)

{T1≧(C−A)>T2} is true, and {T1≧(E−A)>T2} is true, and
{T1≧(G−A)>T2} is true. (6-18)

When the matrix pattern shown in FIG. 3C is classified into the three types, expressions (5) and (6) in the above mentioned expression (IV) are substituted by the following expressions (5-19) and (6-19), the expression (IV) is then used in the classification operation.

{(B−D)>T1} is true, and {(B−E)>T1} is true, and {(B−F)>T1} is true. (5-19)

{T1≧(B−D)>T2} is true, and {T1≧(B−E)>T2} is true, and
{T1≧(B−F)>T2} is true. (6-19)

When the matrix pattern shown in FIG. 3D is classified into the three types, expressions (5) and (6) in the above mentioned expression (IV) are substituted by the following expressions (5-20) and (6-20), the expression (IV) is then used in the classification operation.

{(A−C)>T1} is true, and {(A−E)>T1} is true, and {(A−G)>T1} is true. (5-20)

{T1≧(A−C)>T2} is true, and {T1≧(A−E)>T2} is true, and
{T1≧(A−G)>T2} is true. (6-20)

When the matrix pattern shown in FIG. 3E is classified into the three types, expressions (5) and (6) in the above mentioned expression (IV) are substituted by the following expressions (5-21) and (6-21), the expression (IV) is then used in the classification operation.

{(B−D)>T1} is true, and {(E−D)>T1} is true, and {(H−D)>T1} is true. (5-21)

{T1≧(B−D)>T2} is true, and {T1≧(E−D)>T2} is true, and
{T1≧(H−D)>T2} is true. (6-21)

When the matrix pattern shown in FIG. 3E is classified into the three types, expressions (5) and (6) in the above mentioned expression (IV) are substituted by the following expressions (5-21) and (6-21), the expression (IV) is then used in the classification operation.

{(B−D)>T1} is true, and {(E−D)>T1} is true, and {(H−D)>T1} is true. (5-21)

{T1≧(B−D)>T2} is true, and {T1≧(E−D)>T2} is true, and
{T1≧(H−D)>T2} is true. (6-21)

When the matrix pattern shown in FIG. 3F is classified into the three types, expressions (5) and (6) in the above mentioned expression (IV) are substituted by the following expressions (5-22) and (6-22), the expression (IV) is then used in the classification operation.

{(A−G)>T1} is true, and {(E−G)>T1} is true, and {(I−G)>T1} is true. (5-22)

{T1≧(A−G)>T2} is true, and {T1≧(E−G)>T2} is true, and
{T1≧(I−G)>T2} is true. (6-22)

When the matrix pattern shown in FIG. 3G is classified into the three types, expressions (5) and (6) in the above mentioned expression (IV) are substituted by the following expressions (5-23) and (6-23), the expression (IV) is then used in the classification operation.

{(D−B)>T1} is true, and {(D−E)>T1} is true, and {(D−H)>T1} is true. (5-23)

{T1≧(D−B)>T2} is true, and {T1≧(D−E)>T2} is true, and
{T1≧(D−H)>T2} is true. (6-23)

When the matrix pattern shown in FIG. 3H is classified into the three types, expressions (5) and (6) in the above mentioned expression (IV) are substituted by the following expressions (5-24) and (6-24), the expression (IV) is then used in the classification operation.

{(G−A)>T1} is true, and {(G−E)>T1} is true, and {(G−I)>T1} is true. (5-24)

{T1≧(G−A)>T2} is true, and {T1≧(G−E)>T2} is true, and
{T1≧(G−I)>T2} is true. (6-24)

When the matrix pattern shown in FIG. 3I is classified into the three types, expressions (5) and (6) in the above mentioned expression (IV) are substituted by the following expressions (5-25) and (6-25), the expression (IV) is then used in the classification operation.

{(D−H)>T1} is true, and {(E−H)>T1} is true, and {(F−H)>T1} is true. (5-25)

{T1≧(D−H)>T2} is true, and {T1≧(E−H)>T2} is true, and
{T1≧(F−H)>T2} is true. (6-25)

When the matrix pattern shown in FIG. 3J is classified into the three types, expressions (5) and (6) in the above mentioned expression (IV) are substituted by the following expressions (5-26) and (6-26), the expression (IV) is then used in the classification operation.

{(C−I)>T1} is true, and {(E−I)>T1} is true, and {(G−I)>T1} is true. (5-26)

{T1≧(C−I)>T2} is true, and {T1≧(E−I)>T2) is true, and
{T1≧(G−I)>T2} is true. (6-26)

When the matrix pattern shown in FIG. 3K is classified into the three types, expressions (5) and (6) in the above mentioned expression (IV) are substituted by the following expressions (5-27) and (6-27), the expression (IV) is then used in the classification operation.

{(H−D)>T1} is true, and {(H−E)>T1} is true, and {(H−F)>T1} is true. (5-27)

{T1≧(H−D)>T2} is true, and {T1≧(H−E)>T2} is true, and
{T1≧(H−F)>T2} is true. (6-27)

When the matrix pattern shown in FIG. 3L is classified into the three types, expressions (5) and (6) in the above mentioned expression (IV) are substituted by the following expressions (5-28) and (6-28), the expression (IV) is then used in the classification operation.

$$\{(I-C)>T1\} \text{ is true, and } \{(I-E)>T1\} \text{ is true, and } \{(I-G)>T1\} \text{ is true.} \quad (5\text{-}28)$$

$$\{T1 \geq (I-C)>T2\} \text{ is true, and } \{T1 \geq (I-E)>T2\} \text{ is true, and } \{T1 \geq (I-G)>T2\} \text{ is true.} \quad (6\text{-}28)$$

When the matrix pattern shown in FIG. 3M is classified into the three types, expressions (5) and (6) in the above mentioned expression (IV) are substituted by the following expressions (5-29) and (6-29), the expression (IV) is then used in the classification operation.

$$\{(B-F)>T1\} \text{ is true, and } \{(E-F)>T1\} \text{ is true, and } \{(H-F)>T1\} \text{ is true.} \quad (5\text{-}29)$$

$$\{T1 \geq (B-F)>T2\} \text{ is true, and } \{T1 \geq (E-F)>T2\} \text{ is true, and } \{T1 \geq (H-F)>T2\} \text{ is true.} \quad (6\text{-}29)$$

When the matrix pattern shown in FIG. 3N is classified into the three types, expressions (5) and (6) in the above mentioned expression (IV) are substituted by the following expressions (5-30) and (6-30), the expression (IV) is then used in the classification operation.

$$\{(A-C)>T1\} \text{ is true, and } \{(E-C)>T1\} \text{ is true, and } \{(I-C)>T1\} \text{ is true.} \quad (5\text{-}30)$$

$$\{T1 \geq (A-C)>T2\} \text{ is true, and } \{T1 \geq (E-C)>T2\} \text{ is true, and } \{T1 \geq (I-C)>T2\} \text{ is true.} \quad (6\text{-}30)$$

When the matrix pattern shown in FIG. 3O is classified into the three types, expressions (5) and (6) in the above mentioned expression (IV) are substituted by the following expressions (5-31) and (6-31), the expression (IV) is then used in the classification operation.

$$\{(F-B)>T1\} \text{ is true, and } \{(F-E)>T1\} \text{ is true, and } \{(F-H)>T1\} \text{ is true.} \quad (5\text{-}31)$$

$$\{T1 \geq (F-B)>T2\} \text{ is true, and } \{T1 \geq (F-E)>T2\} \text{ is true, and } \{T1 \geq (F-H)>T2\} \text{ is true.} \quad (6\text{-}31)$$

When the matrix pattern shown in FIG. 3P is classified into the three types, expressions (5) and (6) in the above mentioned expression (IV) are substituted by the following expressions (5-32) and (6-32), the expression (IV) is then used in the classification operation.

$$\{(C-A)>T1\} \text{ is true, and } \{(C-E)>T1\} \text{ is true, and } \{(C-I)>T1\} \text{ is true.} \quad (5\text{-}32)$$

$$\{T1 \geq (C-A)>T2\} \text{ is true, and } \{T1 \geq (C-E)>T2\} \text{ is true, and } \{T1 \geq (C-I)>T2\} \text{ is true.} \quad (6\text{-}32)$$

Figure 6:
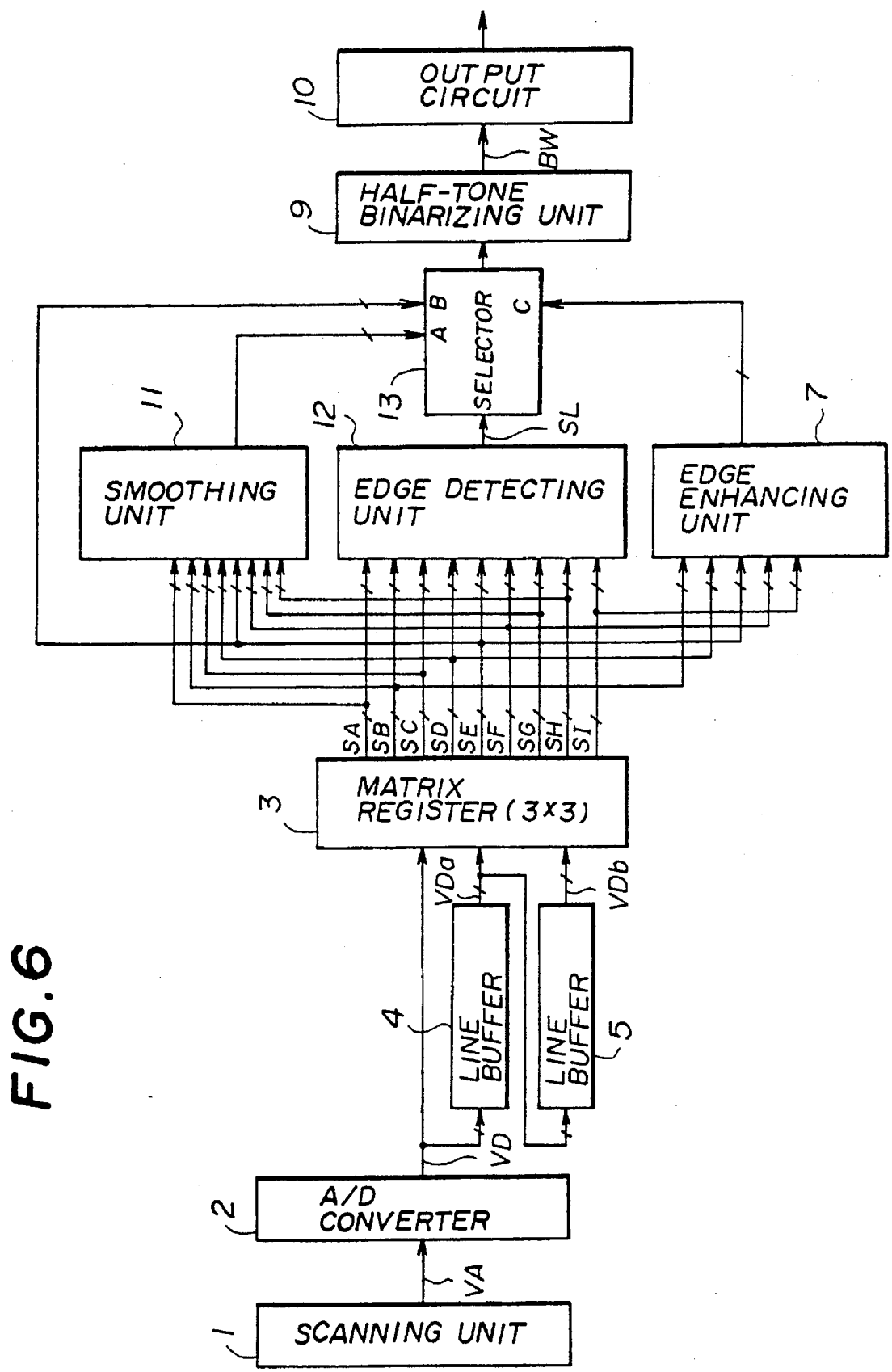
FIG. 6 is a block diagram of a third embodiment of an image processing device according to the present invention.

FIG. 6 is a block diagram of a third embodiment of the image processing device according to the present invention. In FIG. 6, parts that are the same as parts shown in FIGS. 4 and 5 are given the same reference numerals from figure to figure, and descriptions thereof will be omitted.

In FIG. 6, an edge detecting unit 12 performs the edge examining operation in accordance with signals SA, SB, SC, SD, SE, SF, SG, SH and SI output from a matrix register 3 so as to determine whether the focus pixel is an edge pixel, a non-edge pixel or an unclassifiable pixel. The edge detecting unit 12 supplies the resultant selection signal SL to a selector 13.

An input terminal A of the selector 13 is supplied with an output signal from a smoothing unit 11. An input terminal B of the selector 13 is supplied with the signal SE output from the matrix register 3. An input terminal C of the selector 13 is supplied with an output signal from the edge enhancing unit 7.

When a selection signal SL, supplied by the edge detecting unit 12, has a value corresponding to a non-edge pixel, the selector 13 selects the output signal supplied to the input terminal A, which signal is supplied by the smoothing unit 11, and outputs the signal, as a signal of the focus pixel E, to a half-tone binarizing unit 9. When the selection signal SL has a value corresponding to an unclassifiable edge pixel, the selector 13 selects the output signal supplied to the input terminal B and outputs the signal, as a signal of the focus pixel E, to a half-tone binarizing unit 9. When the selection signal SL has a value corresponding to an edge pixel, the selector 13 selects the output signal supplied to the input terminal C, which signal is supplied by the edge enhancing unit 7, and outputs the signal, as a signal of the focus pixel E, to a half-tone binarizing unit Accordingly, in this embodiment, an enhanced signal is supplied to the half-tone binarizing unit 9 for a pixel determined to be an edge pixel, a smoothed signal is supplied to the half-tone binarizing unit 9 for a pixel determined to be a non-edge pixel, and an unenhanced, unsmoothed signal is supplied to the half-tone binarizing unit 9 for a pixel determined to be neither an edge pixel nor a non-edge pixel. Thus a non-half-tone image, such as a character, is reproduced clearly, and a clear picture is reproduced without a moire of a mesh picture being obtained therein; thus resulting an improvement of picture quality.

It should be noted that the equations used in the MTF correction process and smoothing process of the above-mentioned embodiments are not limited to the specifically disclosed equation, and other methods may be used. Additionally, in the above mentioned embodiments, a 3*3 pixel matrix is used in the pixel examining process to determine an edge pixel, but a pixel matrix having different size may also be used.

The present invention is not limited to the specifically disclosed embodiments, and variations and modifications may be made without departing from the scope of the present invention.

What is claimed is:

1. An image processing method in which each pixel data of a gray-scale image, which data is obtained by means of scanning an original, is determined as either being or not being an edge pixel corresponding to an edge of a picture of the original, the method comprising the steps of:

a) preparing a 3*3 pixel matrix including a focus pixel to be processed, wherein said focus pixel is positioned in the center of the matrix and bordering pixels surround said focus pixel; and b) determining said focus pixel as either being an edge pixel or not being an edge pixel, by performing a plurality of comparisons of an intensity of said focus pixel with three intensities of respective bordering pixels of a plurality of different sets containing three bordering pixels, the three bordering pixels in each set being arranged consecutively around said focus pixel to form three intensity differences for each one of said plurality of sets, wherein:

1) the three consecutively arranged border pixels in each set include either three consecutive co-linear border pixels, or three non-co-linear pixels including a corner border pixel; and 2) said focus pixel is determined to be an edge pixel when each of the three intensity differences between said focus pixel and each of said three respective bordering pixels in any set of bordering pixels is greater than a predetermined value.

2. The image processing method as claimed in claim 1, wherein said step of determining said focus pixel as either being an edge pixel or not being an edge pixel is performed by a logical circuit which outputs a determination signal in accordance with a logical expression in which all of said three intensity differences of at least one of said plurality of sets is greater than a predetermined threshold value.

3. The image processing method as claimed in claim 1, wherein said focus pixel is determined to be an edge pixel when each of intensity differences between said focus pixel and each of said three bordering pixels is greater than a predetermined first value, said focus pixel being determined to be an unclassifiable pixel when each of intensity differences between said focus pixel and each of said three bordering pixels falls within a range between said first value and a predetermined second value smaller than said first value, and said focus pixel being determined to be a non-edge pixel when said focus pixel is determined neither an edge pixel nor an unclassifiable pixel.

4. An image processing method in which each pixel data of a gray-scale image, which data is obtained by means of scanning an original, is determined as either being or not being an edge pixel corresponding to an edge of a picture of the original, the method comprising the steps of:
   a) preparing a 3*3 pixel matrix including a focus pixel to be processed, so that said focus pixel is positioned in the center of the matrix and so that eight bordering pixels surround said focus pixel, said pixel matrix including sets of three bordering pixels, each set of three bordering pixels including two first pixels and a second pixel, one of said two first pixels being positioned at each of two sides of said focus pixel so that said two first pixels and said focus pixel lie along a line, said second pixel being positioned adjacent to said focus pixel and at an equal distance from either of said first pixels; and
   b) determining whether or not said focus pixel is an edge pixel, the determining being based on said sets of said second pixel and said two first pixels by comparing an intensity of said second pixel with intensities of each of said first pixels and said focus pixel for each of said sets.

5. The image processing method as claimed in claim 4, wherein said focus pixel is determined to be an edge pixel when each of intensity differences between the intensity of said second pixel and the intensities of each of said first pixels and said focus pixel is greater than a predetermined value.

6. The image processing method as claimed in claim 4, wherein said focus pixel is determined to be an edge pixel when each of intensity differences between said second pixel and each of said first pixels and focus pixel is greater than a first predetermined value, said focus pixel is determined to be an unclassifiable pixel which does not correspond to either an edge pixel or a non-edge pixel when each of intensity differences between said second pixel and each of said first pixels and said focus pixel falls within a range between said first predetermined value and a second predetermined value smaller than said first predetermined value, and said focus pixel is determined to be a non-edge pixel when said focus pixel is determined neither an edge pixel nor an unclassifiable pixel.

7. An image processing method in which each pixel data of a gray-scale image, which data is obtained by means of scanning an original, is converted into a binary image-signal, the image processing device comprising:

a) matrix preparing means for preparing a 3*3 pixel matrix comprising a focus pixel to be processed, so that said focus pixel is positioned in the center of the matrix and bordering pixels surround said focus pixel, said matrix preparing means including means for outputting a focus-pixel signal, and bordering-pixel signals corresponding to each of said bordering pixels;

b) determining means for determining whether or not said focus pixel is an edge pixel by performing a plurality of comparisons of an intensity of said focus pixel with three intensities of respective bordering pixels of each one of a plurality of different sets containing three bordering pixels, the three bordering pixels in each set being consecutively arranged around said focus pixel, wherein:
   1) the three consecutively arranged border pixels in each set include either three consecutive co-linear border pixels, or three non-co-linear pixels including a corder border pixel; the comparison using said focus pixel signal and bordering pixel-signals supplied by said matrix preparing means, and said determining means also being for outputting a control signal indicating the above determined condition of said focus pixel;
   2) the comparing includes using said focus-pixel signal and bordering-pixel signals supplied by said matrix preparing means; and
   3) said determining means includes means for outputting a control signal indicating the above determined condition of said focus pixel;

c) enhancing means for enhancing said focus-pixel signal supplied by said matrix preparing means by applying a predetermined enhancing process thereto, and for outputting an enhanced pixel signal;

d) selecting means for selecting a selected pixel signal, in accordance with said control signal supplied by said determining means, from among said focus-pixel signal supplied by said matrix preparing means and said enhanced-pixel signal supplied by said enhancing means, wherein:
   1) said enhanced pixel signal is output as the selected pixel signal when said control signal indicates that the focus pixel is an edge pixel, and
   2) said focus pixel signal is output as the selected pixel signal when said control signal does not indicate that the focus pixel is an edge pixel; and e) processing means for processing said selected pixel signal supplied by said selecting means by applying a half-tone binarizing process, and for outputting said binary image signal.

8. The image processing device as claimed in claim 7, wherein said determining means comprises means for determining said focus pixel as being an edge pixel when each of intensity differences between said focus pixel and each of said three bordering pixels is greater than a predetermined value.

9. An image processing device in which each pixel data of a gray-scale image, which data is obtained by scanning an original, is converted into a binary image-signal, the image processing device comprising:
   a) matrix preparing means for preparing a 3*3 pixel matrix comprising a focus pixel to be processed, so that said focus pixel is positioned in the center of the matrix and bordering pixels surround said focus pixel, said matrix preparing means including means for outputting a focus-pixel signal, and bordering-pixel signals corresponding to each of said bordering pixels;

b) determining means for determining whether or not said focus pixel is an edge pixel by comparing an intensity of said focus pixel with three intensities of respective bordering pixels arranged in a set containing three bordering pixels, the three bordering pixels in the set being consecutively arranged around said focus pixel, wherein:
   1) the three consecutively arranged border pixels in each set include either three consecutive co-linear border pixels, or three non-co-linear pixels including a corner border pixel;
   2) the comparing includes using said focus-pixel signal and bordering-pixel signals supplied by said matrix preparing means; and
   3) said determining means includes means for outputting a control signal indicating the above determined condition of said focus pixel;
c) smoothing means for smoothing said focus pixel signal supplied by said matrix preparing means by applying a predetermined smoothing process, and for outputting a smoothed pixel signal;
d) selecting means for selecting a selected pixel signal, in accordance with a signal supplied by said determining means, from among said focus-pixel signal supplied by said matrix preparing means and said smoothed pixel signal supplied by said smoothing means, and for outputting the selected pixel signal corresponding to said focus pixel; and
e) processing means for processing said selected pixel signal supplied by said selecting means by applying a half-tone binarizing process thereto, and for outputting said binary image-signal.

10. The image processing device as claimed in claim 9, wherein said determining means comprises means for determining said focus pixel as being an edge pixel when each of intensity differences between said focus pixel and each of said three bordering pixels is greater than a predetermined value.

11. An image processing device in which each pixel data of a gray-scale image data, which data is obtained by scanning an original, is converted into a binary image signal, the image processing device comprising:
   a) matrix preparing means for preparing a 3*3 pixel matrix including a focus pixel to be processed, so that said focus pixel is positioned in the center of the matrix and bordering pixels surround said focus pixel, said pixel matrix including sets of three bordering pixels, each set of three bordering pixels including two first pixels and a second pixel, one of said two first pixels being positioned at each of two sides of said focus pixel so that said two first pixels and said focus pixel lie along a line, said second pixel being positioned adjacent to said focus pixel and at equal distance from either of said first pixels, said matrix preparing means including means for outputting a focus-pixel signal and bordering-pixel signals corresponding to each of said bordering pixels;
   b) determining means for determining whether or not said focus pixel is an edge pixel the determining being based on said sets of said second pixel and said two first pixels, by comparing an intensity of said second pixel with intensities of each of said first pixels and said focus pixel for each of said sets, and for outputting a control signal indicating the above determined condition of said focus pixel;
   c) enhancing means for enhancing said focus-pixel signal supplied by said matrix preparing means by applying a predetermined enhancing process thereto, and for outputting an enhanced pixel signal;
   d) selecting means for selecting, in accordance with said control signal supplied by said determining means, a selected pixel signal from among said focus-pixel signal supplied by said matrix preparing means and said enhanced pixel signal supplied by said enhancing means, wherein:
      1) said enhanced pixel signal is output as the selected pixel signal when said control signal indicates that the focus pixel is an edge pixel; and
      2) said focus-pixel signal is output as the selected pixel signal when said control signal does not indicate that the focus pixel is an edge pixel; and
   e) processing means for processing said selected pixel-signal supplied by said selecting means by applying a half-tone binarizing process thereto, and for outputting said binary image signal.

12. The image processing device as claimed in claim 11, wherein said determining means comprises means for determining said focus pixel as being an edge pixel when each of intensity differences between the intensity of said second pixel and intensities of each of said first pixels and focus pixel is greater than a predetermined value.

13. An image processing device in which each pixel data of a gray-scale image, which data is obtained by scanning an original, is converted into a binary image-signal, the image processing device comprising:
   a) matrix preparing means for preparing a 3*3 pixel matrix including a focus pixel to be processed, so that said focus pixel is positioned in the center of the matrix and bordering pixels surround said focus pixel, said pixel matrix including sets of three bordering pixels, each set of three bordering pixels including two first pixels and a second pixel, one of said two first pixels being positioned at each of two sides of said focus pixel so that said two first pixels and said focus pixel lie along a line, said second pixel being positioned adjacent to said focus pixel and at equal distance from either of said first pixels, said matrix preparing means including means for outputting a focus-pixel signal, and bordering-pixel signals corresponding to each of said bordering pixels;
   b) determining means for determining whether or not said focus pixel is an edge pixel, the determining being based on said sets of said second pixel and said two first pixels, by comparing an intensity of said second pixel with intensities of each of said first pixels and said focus pixel for each of said sets, and for outputting a control signal indicating the above determined condition of said focus pixel;
   c) smoothing means for smoothing said focus pixel signal supplied by said matrix preparing means by applying a predetermined smoothing process, and for outputting a smoothed pixel signal;
   d) selecting means for selecting a selected pixel signal, in accordance with said control signal supplied by said determining means, from among said focus-pixel signal supplied by said matrix preparing means and said smoothed pixel signal supplied by said smoothing means, and for outputting the selected pixel-signal corresponding to said focus pixel; and
   e) processing means for processing said selected pixel signal supplied by said selecting means by applying a half-tone binarizing process thereto, and for outputting said binary image signal.

14. The image processing device as claimed in claim 13, wherein said determining means comprises means for determining said focus pixel as being an edge pixel when each of intensity differences between the intensity of said second pixel and each of the intensities of each of said first pixels and said focus pixel is greater than a predetermined value.

15. An image processing device in which each pixel data of a gray-scale image data, which data is obtained by scanning an original, is converted into a binary image-signal, the image processing device comprising:
   a) matrix preparing means for preparing a 3*3 pixel matrix including a focus pixel to be processed, so that said focus pixel is positioned in the center of the matrix and bordering pixels surround said focus pixel, said matrix preparing means including means for outputting a focus-pixel signal, and bordering-pixel signals corresponding to each of said bordering pixels;
   b) determining means for determining whether said focus pixel is an edge pixel corresponding to an edge of a picture of said original, a non-edge pixel not corresponding to an edge of the picture of said original, or an unclassifiable pixel which does not correspond either to an edge pixel or to a non-edge pixel, wherein:
      1) the determining includes using said focus-pixel signal and said bordering pixel-signals supplied by said matrix preparing means;
      2) the determining includes comparing an intensity of said focus pixel with three intensities of respective bordering pixels arranged in a set containing three bordering pixels, the three bordering pixels in the set being consecutively arranged around said focus pixel;
      3) the three consecutively arranged border pixels in each set include either three consecutive co-linear border pixels, or three non-co-linear pixels including a corner border pixel; and
      4) said determining means includes means for outputting a control signal indicating the above determined condition of said focus pixel;
   c) enhancing means for enhancing said focus-pixel signal supplied by said matrix preparing means by applying a predetermined enhancing process, and for outputting an enhanced pixel signal;
   d) smoothing means for smoothing said focus pixel signal supplied by said matrix preparing means by applying a predetermined enhancing process thereto, and for outputting a smoothed pixel signal;
   e) selecting means for selecting, in accordance with said control signal supplied by said determining means, a selected pixel signal from among said focus-pixel signal supplied by said matrix preparing means, said enhanced pixel signal supplied by said enhancing means, and said smoothed pixel signal supplied by said smoothing means, wherein:
      1) said enhanced pixel signal is output as the selected pixel signal when said control signal indicates said focus pixel is an edge pixel;
      2) said smoothed pixel signal is output as the selected pixel signal when said control signal indicates that said focus pixel is a pixel other than an edge pixel and non-edge pixel; and
   f) processing means for processing said selected pixel signal supplied by said selecting means by applying a half-tone binarizing process thereto, and for outputting said binary image signal.

16. The image processing device as claimed in claim 15, wherein said determining means comprises means for determining said focus pixel as being an edge pixel when each of intensity differences between said focus pixel and each of said three bordering pixels is greater than a predetermined first intensity value, said focus pixel being determined as an unclassifiable pixel when each of intensity differences between said focus pixel and each of said three bordering pixels falls within a range between said first intensity value and a predetermined second intensity value smaller than said first intensity value, and said focus pixel being determined as a non-edge pixel when said focus pixel is determined neither to be an edge pixel nor to be an unclassifiable pixel.

17. An image processing device in which each pixel data of a gray-scale image, which data is obtained by scanning an original, is converted into a binary image-signal, the image processing device comprising:
   a) matrix preparing means for preparing a 3*3 pixel matrix comprising a focus pixel to be processed, so that said focus pixel is positioned in the center of the matrix and bordering pixels surround said focus pixel, said pixel matrix including sets of three bordering pixels, each set of three bordering pixels including two first pixels and a second pixel, one of said two first pixels being positioned at each of two sides of said focus pixel so that said two first pixels and said focus pixel lie along a line, said second pixel being positioned adjacent to said focus pixel and at equal distance from either of said first pixels, said matrix preparing means including means for outputting a focus-pixel signal, and bordering-pixel signals corresponding to each of said bordering pixels;
   b) determining means for determining whether said focus pixel is an edge pixel corresponding to an edge of a picture of said original, a non-edge pixel not corresponding to an edge of the picture of said original, or an unclassifiable pixel which corresponds to neither an edge pixel nor a non-edge pixel, wherein:
      1) the determining includes using said focus-pixel signal and bordering pixel-signals supplied by said matrix preparing means;
      2) the determining is based on said sets of said second pixel and said two first pixels, and includes comparing an intensity of said second pixel with intensities of each of said first pixels and said focus pixel for each set; and
      3) the determining means includes means for outputting a control signal indicating the above determined condition of said focus pixel;
   c) enhancing means for enhancing said focus-pixel signal supplied by said matrix preparing means by applying a predetermined enhancing process thereto, and for outputting an enhanced pixel signal;
   d) smoothing means for smoothing said focus-pixel signal supplied by said matrix preparing means by applying a predetermined smoothing process thereto, and for outputting a smoothed pixel signal;
   e) selecting means for selecting a selected pixel signal, in accordance with said control signal supplied by said determining means, from among said focus-pixel signal supplied by said matrix preparing means, said enhanced pixel signal supplied by said enhancing means and said smoothed pixel signal supplied by said smoothing means, wherein:
      1) said enhanced pixel signal is output as a selected pixel signal when said control signal indicates that said focus pixel is an edge pixel;
      2) said smoothed pixel signal is output as a selected signal when said control signal indicates that said focus pixel is a non-edge pixel; and f) processing means for processing said selected pixel signal supplied by said selecting means by applying a half-tone binarizing process, and for outputting said binary image signal.

18. The image processing device as claimed in claim 17, wherein said determining means comprises means for determining said focus pixel as being an edge pixel when each of intensity differences between the intensity of said second pixel and each of the intensities of each of first pixels and said focus pixel is greater than a predetermined first value, said focus pixel being determined as an unclassifiable pixel when each of intensity differences between the intensity of said second pixel and the intensities each of said first pixels and said focus pixel falls within a range between said first value and a predetermined second value smaller than said first value, and said focus pixel being determined as a non-edge pixel when said focus pixel is neither an edge pixel nor an unclassifiable pixel.

* * * * *